No. 634,763. Patented Oct. 10, 1899.
E. A. POLSLEY.
BASKET.
(Application filed Apr. 21, 1899.)

(No Model.)

Witnesses
J. P. Britt
Chas. E. Brock

Inventor
E. A. Polsley
by O'Meara
Attorneys

THE NORRIS PETERS CO., PHOTO-LITHO., WASHINGTON, D. C.

UNITED STATES PATENT OFFICE.

EDGAR A. POLSLEY, OF LETART, WEST VIRGINIA.

BASKET.

SPECIFICATION forming part of Letters Patent No. 634,763, dated October 10, 1899.

Application filed April 21, 1899. Serial No. 713,997. (No model.)

*To all whom it may concern:*

Be it known that I, EDGAR A. POLSLEY, a citizen of the United States, residing at Letart, in the county of Mason and State of West Virginia, have invented a new and useful Improvement in Baskets, of which the following is a specification.

This invention relates generally to baskets, and more particularly to one constructed of a series of flexible staves, the object of the present invention being to provide a basket of this kind with an exceedingly durable handle, all baskets heretofore made having been weak at this point.

With this object in view my invention consists, essentially, in making the handle an integral part with two of the staves, said handle portion being curved over from opposite sides and fastened by means of the hoop upon both the interior and exterior of the staves.

The invention consists also in certain details of construction and novelties of combination, all of which will be fully described hereinafter and pointed out in the claim.

Figure 1:
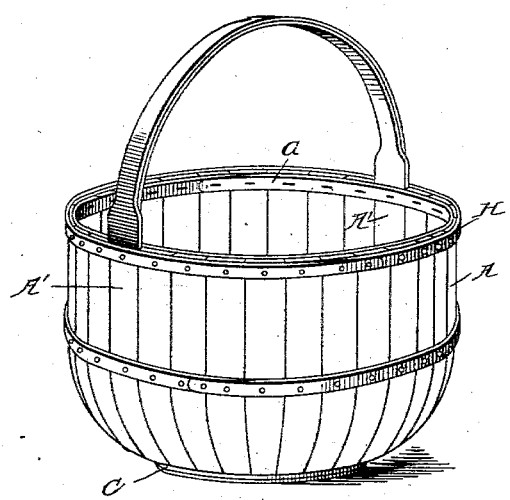
Figure 2:
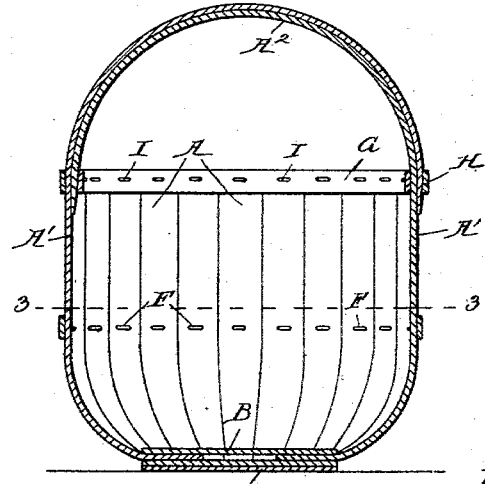
Figure 3:
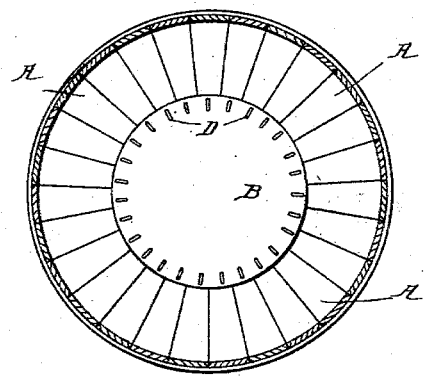
Figure 4:
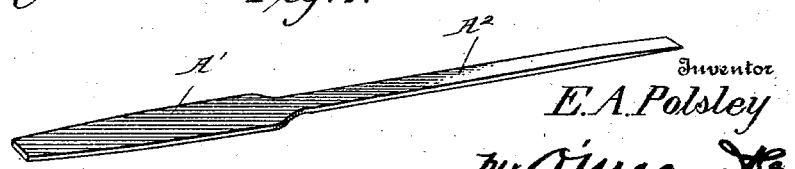

In the drawings forming part of this specification, Figure 1 is a perspective view of a basket constructed in accordance with my invention. Fig. 2 is a vertical sectional view taken through the handles, and Fig. 3 is a horizontal section taken on the line 3 3 of Fig. 2. Fig. 4 is a detail perspective view of one of the staves having the handle part integral therewith.

In carrying out my invention I employ a series of staves A, which taper gradually toward their lower ends, which lower ends are fastened edge to edge between the upper and lower bottom plates B and C, respectively, said bottom plates being formed of a circular piece of wood or other material, and the ends of the staves are securely fastened by means of rivets or staples D, passing through the bottom plates and the rivets, as most clearly shown in Fig. 3.

In practice I prefer to make the lower plates C double, with the grain arranged crosswise in order to prevent warping. This bottom plate forms a suitable base for the basket to rest upon. The staves after being secured to the bottom are curved upwardly and arranged in an essentially cylindrical form and are secured about midway their height by means of an encircling hoop, these staples or rivets F being driven through the said hoop and staves. The upper ends of the staves are securely fastened between the inner hoop G and the outer hoop H, staples or rivets I being driven through both hoops and the intervening staves. This construction completes the basket proper. In order to provide a suitable handle, however, I construct the two side staves A' with handle portions A², said staves being arranged at diametrically opposite points, and the handle portions A² are curved over, as shown, and fastened against the opposing staves and fastened between the hoops by means of a rivet or staple, as most clearly shown in Fig. 2, one of the handle portions being fastened between the stave and the inner hoop, while the other one is fastened between the stave and the outer hoop. By this means I provide a handle which is rigidly connected to the basket proper and being of double thickness is not liable to be broken.

It will thus be seen that I provide an exceedingly cheap, simple, and efficient and durable construction of basket, in which it will be impossible for the handle to pull out or become disengaged from the basket proper.

It will also be understood that I provide a basket which is perfectly tight, inasmuch as the staves are driven tightly together and contact with each other along their entire length, the lower ends being beveled in order to enable them to be curved and brought together at a common center, thereby avoiding the overlapping of the staves which is common in other constructions of baskets.

Having thus fully described my invention, what I claim as new, and desire to secure by Letters Patent of the United States, is—

A basket of the kind described, comprising a series of staves, the bottom plates for uniting the said staves at their lower ends, the hoops for holding the said staves in place, and the handle members formed integral with two oppositely-disposed staves, said handle members being adapted to be bent and fastened with the opposing staves, substantially as and for the purposes described.

EDGAR A. POLSLEY.

Witnesses:
WM. STEWART,
LON T. PILCHARD.